United States Patent [19]

Glaser

[11] Patent Number: 5,353,643
[45] Date of Patent: Oct. 11, 1994

[54] PRESSURE SENSOR

[75] Inventor: Josef Glaser, Graz, Austria

[73] Assignee: AVL Gesellschaft für Verbrennungskraftmaschinen und Messtechnik mbH Prof. Dr.Dr.h.c. Hans List, Graz, Austria

[21] Appl. No.: 990,799

[22] Filed: Dec. 15, 1992

[30] Foreign Application Priority Data

Dec. 16, 1991 [AT] Austria ................... 2492/91

[51] Int. Cl.⁵ ................... G01L 9/12; G01L 19/04
[52] U.S. Cl. ............................ 73/708; 73/718; 73/724; 73/729.2
[58] Field of Search ............. 73/718, 729.2, 724, 73/708

[56] References Cited

U.S. PATENT DOCUMENTS 3,645,137 2/1972 Hazen .................... 73/718

FOREIGN PATENT DOCUMENTS 374922 6/1984 Austria.
2735171 3/1978 Fed. Rep. of Germany.
3021088 12/1981 Fed. Rep. of Germany.

Primary Examiner—Donald W. Woodiel
Attorney, Agent, or Firm—Watson, Cole, Grindle & Watson

[57] ABSTRACT

To compensate for temperature effects on the measuring signal of a pressure sensor which includes a membrane part with at least indirect signal generation and is a supporting base, the membrane part being deformed by the pressure to be measured and cooperable with a pressure sensing element, the the membrane part is constructed to include at least one pair of concentric cylindrical surfaces positioned at a small radial distance from each other. The cylindrical surfaces are closed along their circumference, and one of the cylindrical surfaces increases its diameter when subjected to pressure and the diameter of the other decreases. Changes of the two diameters in the same direction take place in the instance of a temperature change.

26 Claims, 5 Drawing Sheets

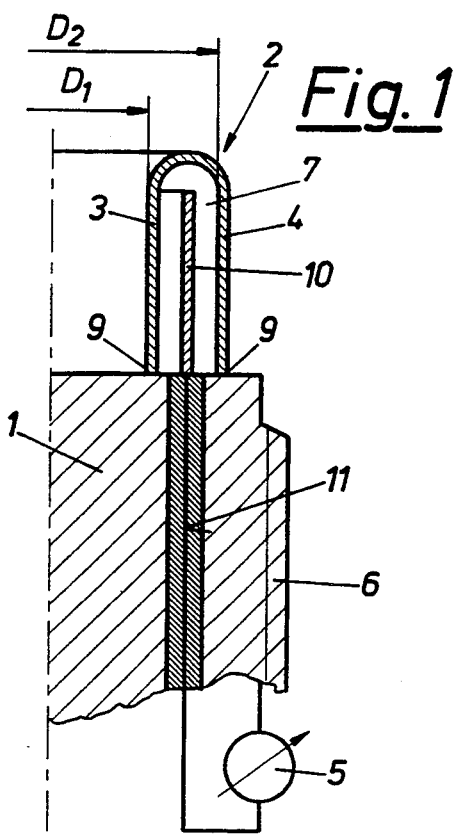
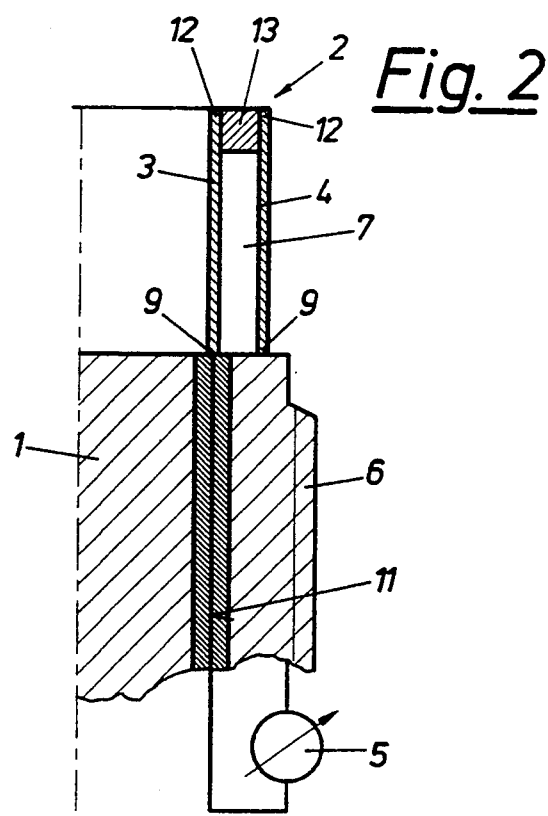
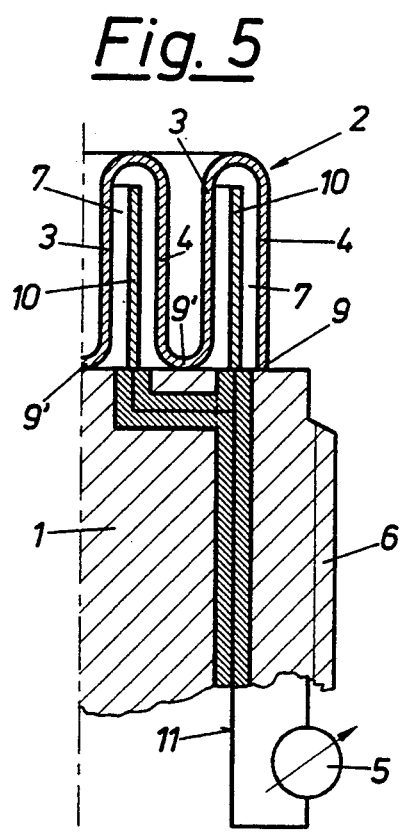
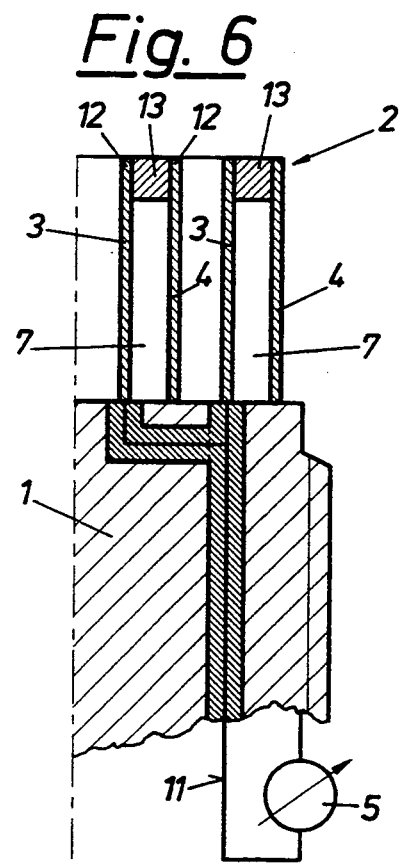

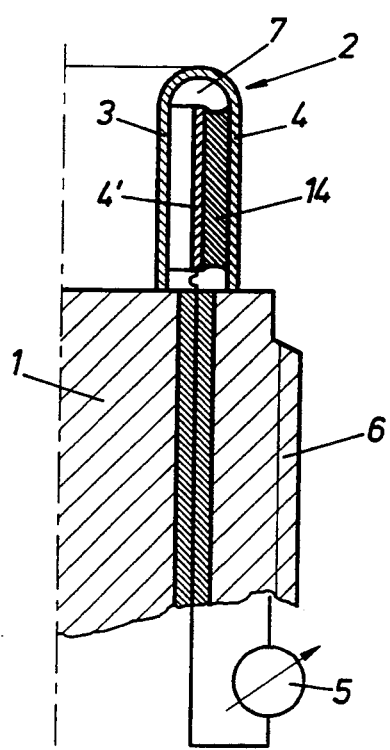
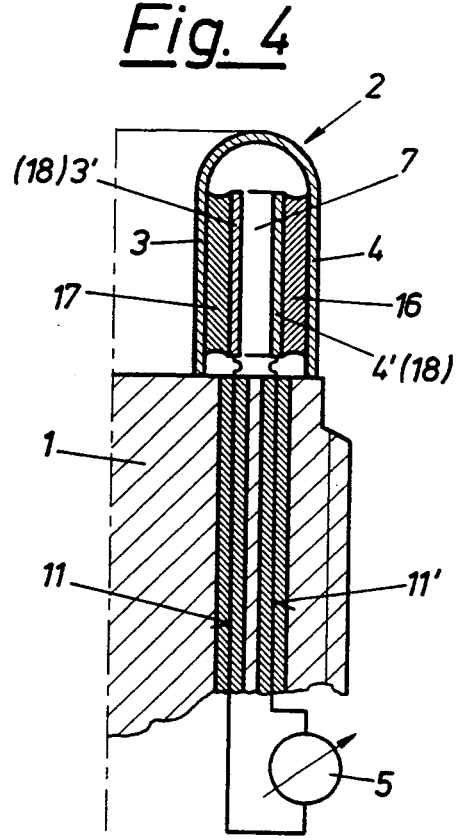
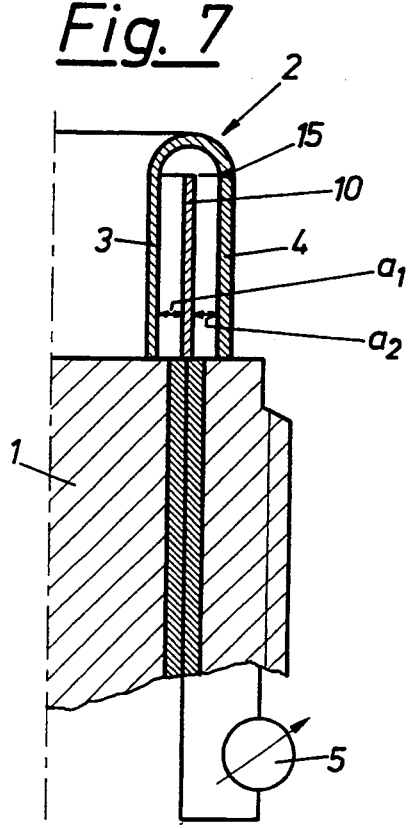
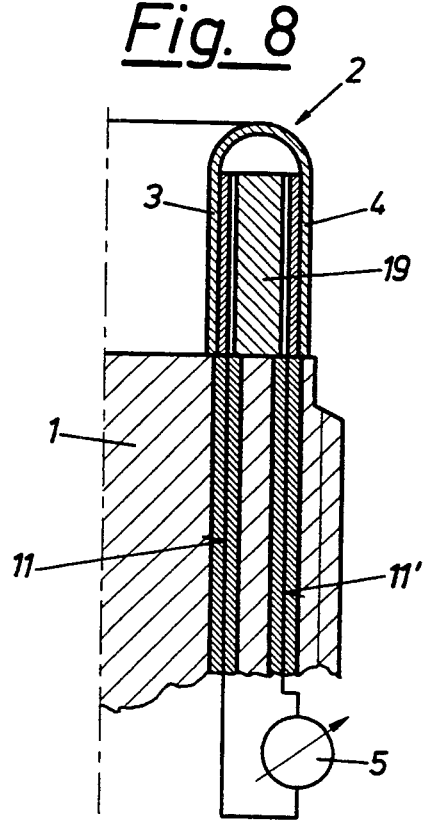

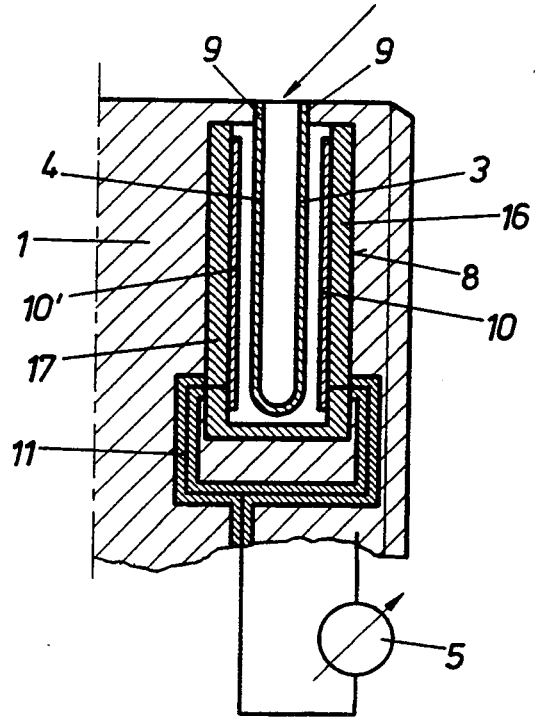
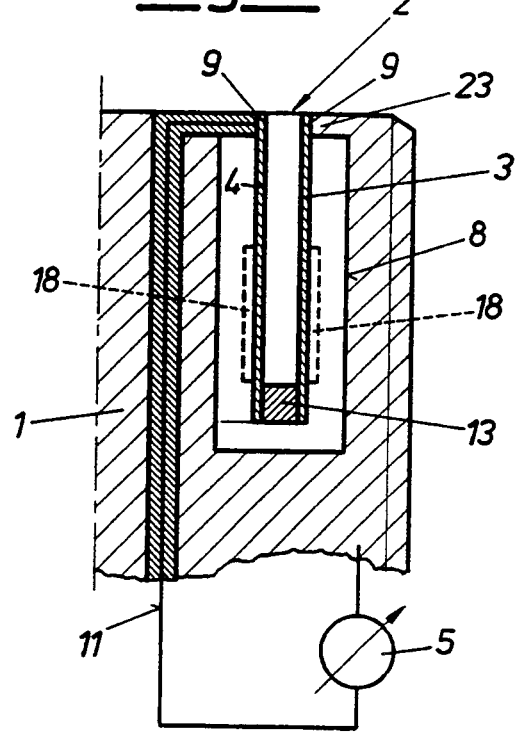
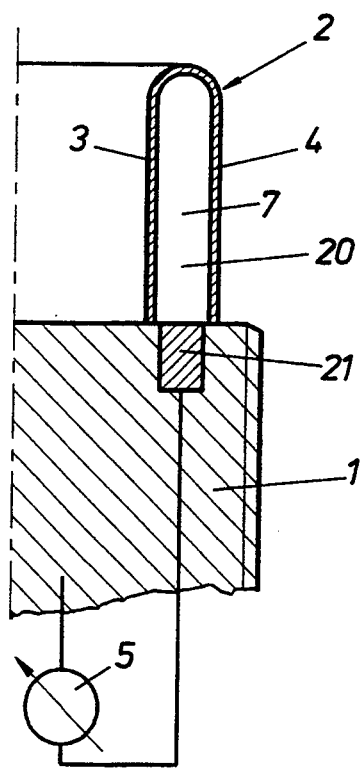
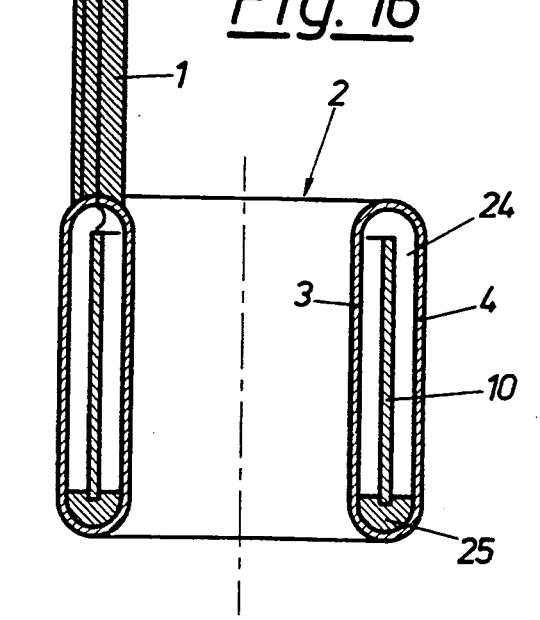

PRESSURE SENSOR

BACKGROUND OF THE INVENTION

This invention relates to a pressure sensor comprising a membrane part with at least indirect signal generation, which is attached to a supporting base and is deformed by the pressure to be measured, and which may cooperate with a pressure sensing element.

DESCRIPTION OF THE PRIOR ART

A pressure sensor of this type is presented in AT-PS 374 922, for example. This sensor is provided with a membrane element whose deformable areas are flat, which is connected to its supporting base or a housing via a thickened rim area forming a gas-tight seal, and which will act upon a measuring element located in the housing via a reinforced center part, with the use of a rod-shaped plunger. The deformable area is ring-shaped with a narrow gap against the housing.

A common problem arising with almost any pressure sensor is the effect on the signal caused by temperature changes, or signal drift resulting from temperature-dependent deformations of the membrane element. In order to prevent large temperature fluctuations of the medium to be measured from reaching the ring-shaped area of the membrane, the membrane part of the sensor known from AT-PS 374 922 is provided with a heat shield located at the reinforced center part and covering the deformable areas of the membrane. This will only partly prevent signal errors resulting from short-time temperature fluctuations, however, whereas errors resulting from long-term temperature changes cannot be prevented at all.

In German laid-open print DE-OS 27 35 172 a pressure transducer is disclosed with a cylindrical membrane part, i.e. the exterior shell of the housing, which is coated by a conductive layer. The conductive layer opposite is carried by an element which is not subject to elastic deformation by the relevant pressure forces. The publication does not mention any measures for temperature compensation.

German laid-open print DE-OS 30 21 088 is concerned with a sensor arrangement configured as a tubular capacitor whose cylindrical dielectric generates an active electrical signal upon being subject to pressure. In this instance the two electrodes are used only for charge pickup, but not for any mechanical support against pressure and transformation into a primary test signal, as is the case when a cylindrical membrane is deformed. Whereas a membrane responds elastically to deformation by compression and is capable of taking up pressure forces, the pressure forces in the instance of the tubular capacitor described in DE-OS 30 21 088 are taken up by the dielectric.

SUMMARY OF THE INVENTION

It is an object of the invention to configure a pressure sensor of the aforementioned type in such a way as to effectively compensate for sudden short-time temperature changes and, if possible, also long-term temperature changes.

In the invention this object is achieved by providing the membrane part with at least one pair of concentric cylindrical surfaces positioned at a small radial distance from each other, which are closed along their circumference, one of these cylindrical surfaces increasing its diameter and the other one decreasing its diameter upon being subject to pressure, the two diameters undergoing changes in the same direction in the instance of a temperature change. The advantage of a pressure sensor as described by the invention is that deformations due to heating the sensor, for example, by means of a hot medium, radiation, or mere compression heat, which would produce large signal errors in simple, conventional pressure sensors, are not reduced by shielding but are compensated for to a large degree. The two cylindrical surfaces combined into a pair are deformed upon heating to approximately the same extent (having approximately the same diameter) and in the same direction, whereas the pressure to be measured will cause deformations of approximately the same extent, but acting in opposite directions. Connecting the measuring elements for pressure sensing in such a way that the pressure-proportional deformations are added will subtract the heating-proportional deformations at the same time, thus compensating for the temperature error effectively.

The invention permits a number of variants.

In a first group of preferred variants the membrane part is configured as a rotational body made of one piece, forming at least one annular space of U-shaped cross-section, the cylindrical surfaces enclosing the annular space radially and the free rims of the cylindrical surfaces being attached to the supporting base.

A second group of variants is characterized by the membrane part being made of several pieces, every two of the cylindrical surfaces positioned concentrically to each other forming an annular space of U-shaped cross-section, and being attached to the supporting base by at least one rim. The term U-shaped cross-section refers to both round and angular shapes.

In variants of the invention comprising a multi-piece membrane, the rims of the cylindrical surfaces distant from the supporting base may be connected to a spacing element in pairs. If the two cylindrical surfaces are configured as electrodes of a capacitive measuring system and are at different electrical potentials, the spacing element may be made from insulating material.

A particularly simple variant of the invention provides that two of the concentric cylindrical surfaces be made of electrically conductive material, be insulated from each other, and be configured as electrode and counter-electrode of a capacitive measuring system.

By their outward appearance the individual variants of the pressure sensor of the invention may be divided into three main groups, the first group being characterized by the fact that the membrane part is subject to the pressure to be measured on the side facing away from the U-shaped annular space, and that at least one pressure sensing element is provided in the U-shaped annular space.

The second main group whose variants introduce only a very small interfering volume into the measuring chamber, are characterized by the fact that the membrane part is placed in an annular groove in the supporting base, and that the membrane part is subject to the pressure to be measured on the side facing towards the U-shaped annular space, and further that a pressure sensing element is placed between each cylindrical surface of the membrane part and the cylindrical wall of the annular groove.

The third group finally is characterized by the fact that the membrane part is configured as a closed torus, the cylindrical surfaces forming concentric boundary surfaces of a closed annular space containing a pressure sensing element. The support or supporting element acting on the toroidal membrane in an area other than the cylindrical measuring surfaces may also be configured as an insulating cable transmitting the electrical signals of the pressure sensing element.

In the individual variants of the invention a number of different pressure sensing elements or pressure measuring systems may be employed. The term pressure sensing element or pressure measuring system refers to devices measuring directly or indirectly deformations of the cylindrical surfaces caused by the pressure to be measured, or rather, the difference of such deformations, thus supplying a measuring signal dependent on the pressure to be measured.

Such measuring elements will operate without appreciable reaction forces on the cylindrical surfaces, i.e., they may measure displacements (capacitive systems, Hall sensors, optical sensors, etc.); elements measuring stresses in the cylindrical surfaces (e.g., strain gauges) will also operate without appreciable reaction forces.

Other measuring elements, due to their rigidity, will take up larger portions of the pressures or forces acting on the cylindrical surfaces, and will generate their signal from the arising forces or pressures (piezoelectric elements, semiconductors whose resistance changes with the force, etc.), or the deformation of the cylindrical surfaces is imparted to the pressure sensing element via a pressure medium.

In the simplest instance the measuring element may thus be provided with one or two electrodes of a capacitive measuring system, which are at the same electrical potential, the counter-electrode being formed by the adjacent cylindrical surface or surfaces.

The measuring element may also be configured as a strain gauge placed on each cylindrical surface of the membrane part, possibly with an electrically insulating layer applied in between.

Finally, the measuring element of the invention may be configured as an element changing its electrical properties upon the application of pressure, for example, a piezoelectric element, which is located between corresponding cylindrical surfaces of the membrane part, or between one of these cylindrical surfaces and an adjacent cylindrical wall of the annular groove. The pressure sensing element may be divided into segments, or it may be provided as a piezoelectric film, for example.

The invention would also permit the filing of the U-shaped annular space of the membrane part with a pressure-transmitting medium in connection with a pressure sensing element placed in the supporting base, or the location of the membrane part in an annular groove of the supporting base, and the filing of the annular space between annular groove and membrane part with a pressure-transmitting medium in connection with a pressure sensing element located in the supporting base. This variant may be used for rapid, cyclical temperature changes which will not cause any major temperature changes in the pressure-transmitting medium.

In simple designs (use of the same wall thickness and material for the cylindrical surfaces) compensation of the temperature deformation and of the resulting erroneous pressure signal (temperature drift) mostly is imperfect, as the mean thermal expansion of the two corresponding cylindrical surfaces will differ by the difference of the diameters.

In the invention remaining differences in expansion of the two surfaces may be compensated for by providing that the cylindrical surfaces of the membrane part combined into pairs be made of materials with different coefficients of thermal expansion, or that the two surfaces have different wall thicknesses (masses).

In very short and sudden temperature rises (for instance, in a combustion chamber), during which only those parts of the membrane are heated which are in contact with the medium, whereas the shielded central electrode remains unaffected, differences in thermal expansion may be avoided by providing that the inner cylindrical surface have a reduced wall thickness. Due to its lower mass the inner cylindrical surface will reach a higher temperature and a deformation corresponding to that of the outer cylindrical surface.

In a capacitive measuring system compensation of the signal components caused by the different diameters may also be achieved by using different widths for the cylindrical gaps between the electrode or electrodes of the capacitive system and the adjacent cylindrical surfaces. The gap next to the cylindrical surface with the smaller diameter should be smaller than the other gap if the wall thicknesses of the two cylindrical surfaces are the same.

In a pressure sensor whose measuring element is an electrode located in the U-shaped annular space of a capacitive system, the counter-electrode may be formed by a cylindrical surface of the membrane part, which is coupled to the electrode by an electrically insulating layer.

The measuring element could also be provided with two electrodes of a capacitive system, which are located in the U-shaped annular space and which are coupled to the adjacent cylindrical surfaces by electrically insulating layers.

The variants with a mechanical coupling offer greater mechanical stability for large-surface, thin electrodes or membrane parts, in addition to minimizing temperature drifts if membrane-, electrode- and insulating materials are suitably chosen and the thicknesses of the individual components are well matched.

The invention finally provides that the membrane part be integrated into a component projecting into the pressure chamber to be monitored, for instance, a spark plug, a heater plug, an injection nozzle, etc.

BRIEF DESCRIPTION OF THE DRAWINGS

The invention will be further described with reference to the accompanying drawings, in which FIG. 1 is an axial section of a pressure sensor of the invention, FIGS. 2 to 15 are sections of variants of the invention, the view corresponding to that of FIG. 1, FIG. 16 presents a pressure sensor of the invention with a toroidal membrane.

DETAILED DESCRIPTION OF PREFERRED EMBODIMENTS

Figure 10:
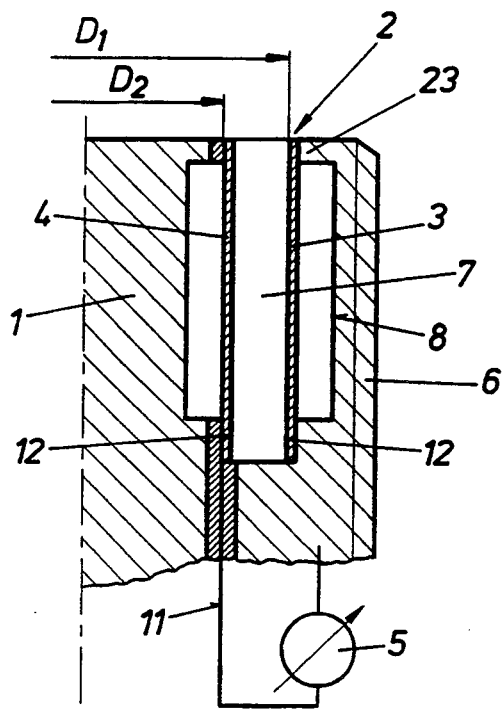

The variants of a pressure sensor shown in FIGS. 1 through 17 have a membrane part 2 located on or in a supporting base 1, which membrane part 2 is deformed by the pressure to be measured and which will generate, either directly or indirectly, a pressure-dependent signal. The membrane part 2 is provided with cylindrical surfaces 3 and 4, which are combined into one or several pairs and are arranged concentrically to each other, and which are located at a small radial distance from each other (exaggerated in the drawings) as compared to the diameter of the cylinder. The pressure to be measured will increase the diameter $D_1$ of the cylindrical surface 3 and decrease the diameter $D_2$ of the surface 4. In the instance of a temperature change diameters $D_1$ and $D_2$ will change in the same direction, such that appropriate circuitry of the pressure sensing elements to be discussed at greater length below will generate a signal independent of temperature effects, which is processed and displayed in an evaluation and display unit 5 shown only schematically.

The pressure sensor is inserted into a measurement bore by a thread 6 provided on the supporting base 1.

In the variants of FIGS. 1 to 9 and 17 the membrane part 2 enclosing an essentially U-shaped annular space 7 is attached on the outside of the supporting base 1 and is subject to the pressure to be measured from outside, i.e., on the side facing away from the annular space 7. In variants 10 to 15, however, the membrane part 2 is located in an annular groove 8 of the supporting base 1. The membrane part 2 is open to the medium to be measured and is subject to the pressure to be measured from inside, i.e., from the side facing towards the annular space. The membrane part 2 may be configured as a one-part rotational body, such as in FIGS. 1, 5, 12, 16, or as a multi-part element, such as in FIGS. 2, 6, 10.

In the variant shown in FIG. 1 the membrane part 2 is fastened to the supporting base 1 by its free rims 9, its U-shaped annular space containing a cylindrical electrode 10 of a capacitive measuring system, which electrode 10 is connected via a line 11 to the evaluation/display unit 5. The second electrode of the capacitive system is formed by the cylindrical surfaces 3 and 4 of the membrane part 2, which are closed along their circumference and are at zero potential. A pressure rise will push the two cylindrical surfaces 3 and 4 closer towards the electrode 10, the signal components of electrode 10 adding up. If there is a temperature rise at the same time, the two diameters $D_1$ and $D_2$ will increase in the same direction, such that in a first approximation, neglecting the slight difference in diameters $D_1$ and $D_2$, no signal contribution is to be expected from this temperature rise.

FIG. 5 shows a variant similar to that of FIG. 1. In this instance several pairs of concentric surfaces 3 and 4 are combined into a membrane part 2. The signal components of the cylindrical electrodes 10 extending into the individual annular spaces 7 are added up to form an output signal. The membrane part 2 may be connected to the supporting base 1 via its rim 9, and via the curved areas 9'.

As is shown in FIGS. 2 and 6, the membrane part 2 may be configured in several pieces, one rim 9 each of the cylindrical surfaces 3 and 4 being attached to the supporting base 1, and the other rims 12 distant from the supporting base (or rather, the rims projecting into the groove 8 of the supporting base) being connected to a spacing element 13 in pairs. In the simple variant of FIGS. 2 and 6 the cylindrical surfaces 3 and 4 constitute a cylindrical electrode and counter-electrode of a capacitive measuring system. The spacing element 13 also serves as an electrical insulator.

FIG. 3 shows a variant of special mechanical stability, where the cylindrical electrode 4' located in the annular space 7 is coupled to one of the cylindrical surfaces 4, by means of an insulating layer 14.

In the variant of FIG. 4 the insides of the cylindrical surfaces 3, 4 of the metal membrane part 2 are covered by insulating layers 16, 17 carrying the electrodes 3', 4' of a capacitive system. Due to this configuration the electrodes 3' and 4' are shielded against electrical fields from outside. Via lines 11, 11' the electrodes 3', 4' are connected to the evaluation/display unit 5. The insulating layers may also be provided with strain gauges 18 as pressure sensing elements instead of electrodes 3', 4'.

The membrane part 2 may also be configured as an electrical insulator whose cylindrical surfaces 3 and 4 carry electrodes of a capacitive system.

Various provisions may be made to minimize temperature drifts caused by the difference in diameters $D_1$ and $D_2$ of the cylindrical surfaces 3 and 4. In a variant shown in FIG. 7, for instance, the gaps $a_1$ and $a_2$ between the cylindrical surfaces 3 or 4 and the cylindrical electrode 10 may have different widths, such that signal contributions due to temperature deformations will compensate each other within certain ranges. As indicated in FIG. 7, the two cylindrical surfaces 3 and 4 of a membrane part 2 may be made of materials with different coefficients of thermal expansion, or different wall thicknesses or masses may be chosen for the two surfaces. The two differing surfaces 3 and 4 may be welded together (cf. weld 15), or they may be connected by an insulating spacing element 13 forming a pressure seal.

Figure 14:
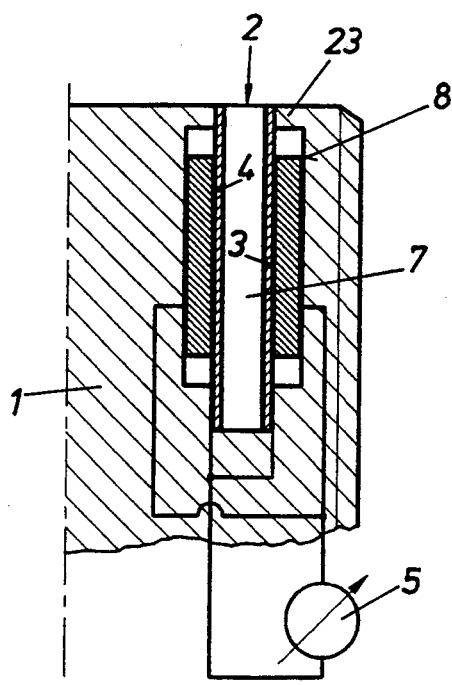
Figure 15:
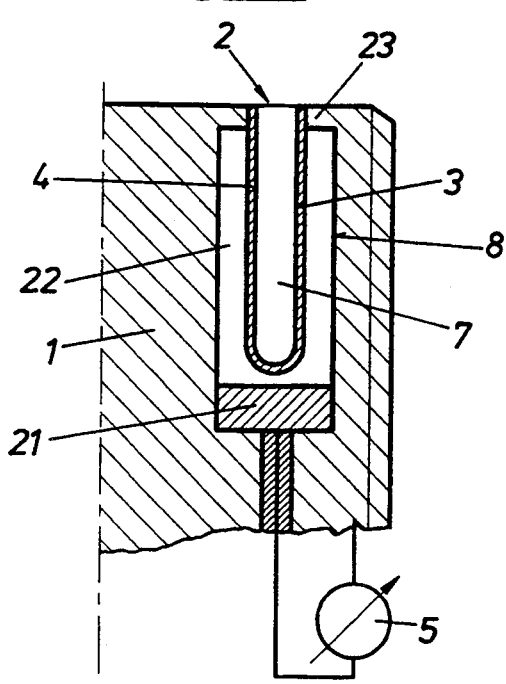

Another variant is presented in FIG. 8, showing a pressure sensitive element, such as a piezoelectric element 19, which is provided in segments or as a piezoelectric film or coating between the cylindrical surfaces 3 and 4 of the membrane part 2, or between one cylindrical surface 3 or 4 and an adjacent cylindrical wall of the annular groove 8 (cf. FIG. 14). Other elements which will change one of their electrical properties when being subject to pressure, may also be used, for example, semiconductors, whose resistance changes with mechanical load.

In the variant shown in FIG. 9 a pressure-transmitting medium 20 is provided the annular space 7, between the cylindrical surfaces 3 and 4 of the membrane part 2, which medium 20 is in connection with a pressure sensing element 21 in the supporting base 1. A similar variant, with a membrane part 2 positioned in an annular groove 8 of the supporting base 1, is presented in FIG. 15. In this case the pressure-transmitting medium 20 is contained in an annular space 22 enclosed by the annular groove 8 and the membrane part 2 located therein.

In the variants according to FIGS. 10 to 15, which are characterized by a very small interfering volume, the membrane part 2 is positioned in an annular groove 8 of the supporting base 1 forming a sensor housing. Behind a narrow region 23 at the rim, where the membrane part 2 is attached, the groove 8 widens into a recess permitting free movement of the cylindrical surfaces 3 and 4 and/or receiving a pressure sensing element.

Figure 11:
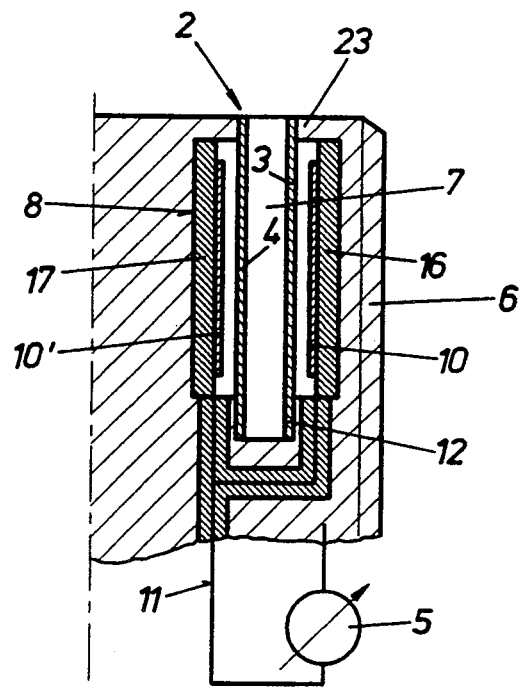

As is shown in FIGS. 10, 11, and 14, for instance, the cylindrical surfaces 3 and 4 may be additionally fastened to the rims 12 at the bottom of the groove 8, which will give a robust and vibration-proof pressure sensor. Whereas in FIG. 10 the cylindrical surfaces 3 and 4 serve as electrode and counter-electrode of a capacitive measuring system, one of which is at zero potential and the other one is electrically insulated against the supporting base 1, the entire membrane part 2 is at zero potential in FIG. 11, and two electrodes 10 and 10' on insulating layers 16 and 17 constitute the second electrode of the capacitive system. The insulating layers may be omitted if the housing or the supporting base 1 are made of electrically insulating material.

As regards their functional principle the variants of FIGS. 12 and 13 correspond to those of FIGS. 11 and 10, the cylindrical surfaces 3, 4 of the former being connected to the supporting base 1 via one rim 9 only, the other rims projecting freely into the groove 8. The membrane part 2 is configured as a one-piece rotational body in FIG. 12 and comprises two separate cylindrical parts in FIG. 13, which are connected by means of an insulating spacing element 13.

As is shown in FIG. 13 by a broken line these variants will also permit the use of strain gauges 18 instead of the capacitive measuring system, which are applied to the cylindrical surfaces 3 and 4 either directly, or with an insulating layer in between.

The variant of FIG. 16 presents a pressure sensor with a toroidal membrane part 2 closed in itself. The cylindrical surfaces 3 and 4 enclose radially a closed annular space 24 containing the pressure sensing element, for instance an electrode 10 of a capacitive measuring system. The cylindrical electrode 10 is held on the membrane part 2 by means of an electrically insulating supporting element 25. If the supporting base 1 is an insulated cable, this cable will contain the lines 11, 11' in contact with the membrane part 2 and the electrode 10.

It should be noted in this context that the underlying measuring principle of the invention could also be applied to a membrane formed by two concentric spherical surfaces, one of which is subject to pressure from outside and the other one from inside, i.e., via one or more openings in the spherical surfaces. Between the two spherical surfaces one of the above pressure gauges is placed.

Figure 17:
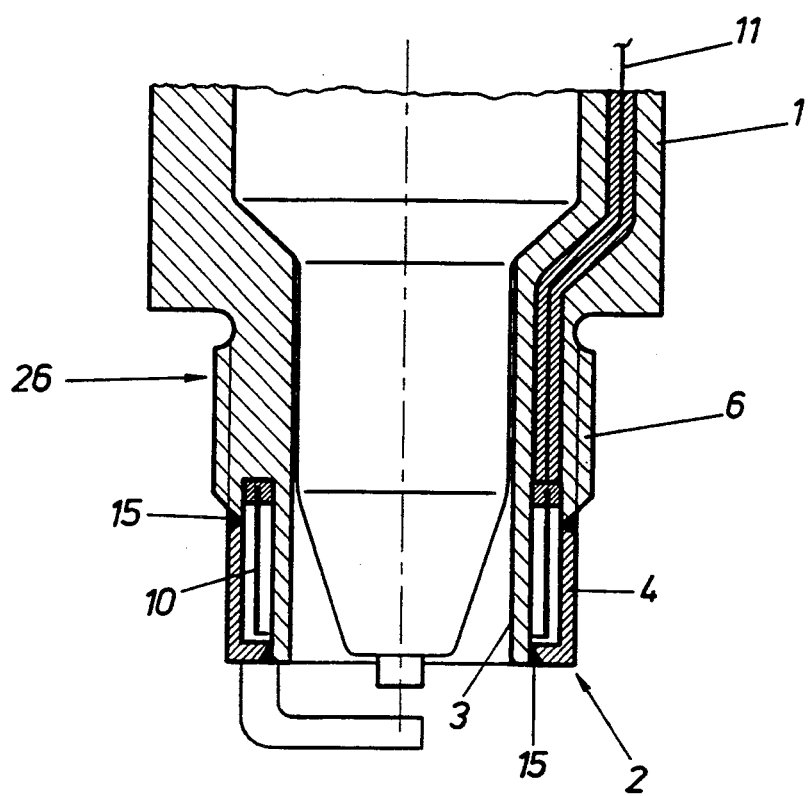
FIG. 17 shows a pressure sensor integrated in a spark plug.

As is shown in FIG. 17, the variants of a pressure sensor as described above may also be integrated in the tip 26 of a spark plug (or heater plug, injection nozzle, etc.) projecting into a pressure chamber, e.g., of an internal combustion engine. The variant chosen for the membrane part in this case may be compared to that of FIG. 1 or FIG. 7.

It is claimed:

1. A pressure sensor comprising a membrane part which is attached to a supporting base and is deformed by the pressure to be measured, wherein said membrane part is provided with at least one pair of concentrical cylindrical surfaces positioned at a small radial distance from each other, a first cylindrical surface of said pair of cylindrical surfaces defining a first diameter and a second cylindrical surface of said pair of concentric cylindrical surfaces defining a second diameter, both of said first and second cylindrical surfaces being closed along their circumference, wherein both of said first and second cylindrical surfaces undergo radial deformation, said first cylindrical surface increasing said first diameter and said second cylindrical surface decreasing said second diameter upon being subjected to pressure, and wherein both of said first and second diameters undergoing changes in the same direction upon being subjected to a temperature change, said radial deformation being a measure for pressure to be determined.

2. A pressure sensor according to claim 1, wherein said membrane part is configured as a one piece made rotational body, forming at least one annular space of U-shaped cross-section, and wherein said first and second cylindrical surfaces enclosing said annular space radially and free rims of said cylindrical surfaces being attached to said supporting base.

3. A pressure sensor according to claim 2, wherein said membrane part is subject to a pressure to be measured on a side facing away from said U-shaped annular space, and wherein at least one pressure sensing element is provided in said U-shaped annular space.

4. A pressure sensor according to claim 3, where said measuring element is an electrode of a capacitive system, said electrode is located in said U-shaped annular space and coupled to one of said first and second cylindrical surfaces by an electrically insulating layer, and wherein a counter-electrode of said capacitive system is formed by the other of said first and second cylindrical surfaces of said membrane part.

5. A pressure sensor according to claim 3, wherein said measuring element is provided with two electrodes of a capacitive system, which are located in said U-shaped annular space and which are coupled to said adjacent first and second cylindrical surfaces by electrically insulating layers.

6. A pressure sensor according to claim 3, wherein said measuring element is provided with an electrode of a capacitive measuring system, and a counter-electrode of said capacitive measuring system being formed by said adjacent first and second cylindrical surfaces.

7. A pressure sensor according to claim 6, wherein different widths are used for cylindrical gaps between said electrode of said capacitive system and said adjacent first and second cylindrical surfaces.

8. A pressure sensor according to claim 2, wherein said membrane part is placed in an annular groove in said supporting base, said annular groove having cylindrical walls, and wherein said membrane part is subject to a pressure to be measured on a side facing towards said U-shaped annular space, and, further, wherein a pressure sensing element is placed between each of said first and second cylindrical surfaces of said membrane part and said cylindrical walls of said annular groove.

9. A pressure sensor according to claim 8, wherein said measuring element is provided with two electrodes of a capacitive measuring system, which are at the same electrical potential, and a counter-electrode of said capacitive measuring system being formed by said adjacent first and second cylindrical surfaces.

10. A pressure sensor according to claim 9, wherein different widths are used for cylindrical gaps between each of said two electrodes of said capacitive system and said adjacent first and second cylindrical surfaces.

11. A pressure sensor according to claim 8, wherein said membrane part is placed in an annular groove in said supporting base, said annular groove having cylindrical walls, and wherein said membrane part is subject to a pressure, which is located between each of said first and second cylindrical surfaces and said adjacent cylindrical wall of said annular groove.

12. A pressure sensor according to claim 1, wherein said membrane part is made of several pieces, every two of said pieces forming first and second cylindrical surfaces positioned concentrically to each other forming an annular space of U-shaped cross-section, and being attached to the supporting base.

13. A pressure sensor according to claim 12, wherein rims of said first and second cylindrical surfaces distant from said supporting base are connected to a spacing element in pairs.

14. A pressure sensor according to claim 12, wherein said first and second concentric cylindrical surfaces are made of electrically conductive material, are insulated against each other, and are configured as electrode and counter-electrode of a capacitive of measuring system.

15. A pressure sensor according to claim 12, wherein said membrane part is subject to a pressure to be measured on a side facing away from said U-shaped annular space, and wherein at least one pressure sensing element is provided in said U-shaped annular space.

16. A pressure sensor according to claim 12, wherein said membrane part is placed in an annular groove in said supporting base, said annular groove having cylindrical walls, and wherein said membrane part is subject to a pressure to be measured on a side facing towards said U-shaped annular space, and, further, wherein a pressure sensing element is placed between each of said first and second cylindrical surfaces of said membrane part and said cylindrical walls of said annular groove.

17. A pressure sensor according to claims 2 or 12, wherein said U-shaped annular space of said membrane part is filled with a pressure-transmitting medium in connection with a pressure sensing element placed in said supporting base.

18. A pressure sensor according to claims 2 or 12, wherein said membrane part is located in an annular groove of said supporting base, and wherein an annular space between said annular groove and said membrane part is filled with a pressure-transmitting medium in connection with a pressure sensing element located in said supporting base.

19. A pressure sensor according to claim 1, wherein said membrane part is configured as a closed torus and said first and second cylindrical surfaces forming concentric boundary surfaces of a closed annular space containing a pressure sensing element.

20. A pressure sensor according to claim 19, wherein said measuring element. is an electrode of a capacitive measuring system which is held on toroidal membrane part by means of an electrically insulating supporting element.

21. A pressure sensor according to claims 3 or 8 or 19, wherein said measuring element is a strain gauge placed on each of first and second cylindrical surfaces of said membrane part, with an electrically insulating layer applied in between.

22. A pressure sensor according to claims 3 or 19, wherein said measuring element is a piezoelectric element, changing its electrical properties upon application of pressure, which is located between said first and second cylindrical surfaces of said membrane part.

23. A pressure sensor according to claim 1, wherein said first and second cylindrical surfaces of said membrane part, which are combined into pairs, are made of materials with different coefficients of thermal expansion.

24. A pressure sensor according to claim 1, wherein said first and second cylindrical surfaces of said membrane part, which are combined into pairs, have different wall thicknesses.

25. A pressure sensor according to claim 1, wherein said membrane part is integrated into a component projecting into a pressure chamber to be monitored.

26. A pressure sensor according to claim 25, wherein said component projecting into a pressure chamber is a spark plug or a heater plug or an injection nozzle.

* * * * *